United States Patent
Fidler et al.

(10) Patent No.: US 7,613,125 B2
(45) Date of Patent: Nov. 3, 2009

(54) METHOD AND APPARATUS FOR TEMPORAL ALIGNMENT OF MULTIPLE PARALLEL DATA STREAMS

(75) Inventors: Franz Fidler, Raglitz (AT); Praveen Kasireddy, Sayreville, NJ (US); Peter J. Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 744 days.

(21) Appl. No.: 11/306,425

(22) Filed: Dec. 28, 2005

(65) Prior Publication Data

US 2007/0291735 A1    Dec. 20, 2007

(51) Int. Cl.
*H04L 1/00* (2006.01)
*G08C 15/00* (2006.01)
*G01R 31/28* (2006.01)
*H04L 7/00* (2006.01)

(52) U.S. Cl. .................. 370/249; 370/248; 714/716; 375/358

(58) Field of Classification Search ......... 370/241–253, 370/249, 507, 503, 506; 375/224, 225, 226, 375/355, 358, 359, 356; 714/716
See application file for complete search history.

(56) References Cited

U.S. PATENT DOCUMENTS

| | | | | |
|---|---|---|---|---|
| 5,163,051 A * | 11/1992 | Biessman et al. | ............ | 714/704 |
| 5,621,720 A * | 4/1997 | Bronte et al. | ................ | 370/241 |
| 5,778,003 A * | 7/1998 | Puppa et al. | ................. | 714/716 |
| 5,956,370 A * | 9/1999 | Ducaroir et al. | ............. | 375/221 |
| 6,363,129 B1 * | 3/2002 | Agazzi | ........................ | 375/355 |
| 6,385,236 B1 * | 5/2002 | Chen | ........................... | 375/224 |
| 6,629,274 B1 * | 9/2003 | Tripp et al. | .................. | 714/721 |
| 6,829,315 B1 * | 12/2004 | Cruikshank | ................. | 375/354 |
| 6,898,185 B1 * | 5/2005 | Agazzi et al. | ............... | 370/241 |
| 6,925,062 B2 * | 8/2005 | Tanaka et al. | ............... | 370/241.1 |
| 6,959,015 B1 * | 10/2005 | Hwang et al. | ............... | 370/516 |
| 6,961,317 B2 * | 11/2005 | Abramovitch et al. | ...... | 370/252 |
| 6,996,738 B2 * | 2/2006 | Chiang | ........................ | 713/503 |
| 7,085,950 B2 * | 8/2006 | Ehmann et al. | ............. | 713/503 |
| 7,093,172 B2 * | 8/2006 | Fan et al. | ..................... | 714/716 |
| 7,110,424 B2 * | 9/2006 | Barnes et al. | ............... | 370/539 |
| 7,111,208 B2 * | 9/2006 | Hoang et al. | ................ | 714/716 |
| 7,145,922 B2 * | 12/2006 | Pitio | ........................... | 370/539 |
| 7,324,458 B2 * | 1/2008 | Schoenborn et al. | ........ | 370/249 |
| 7,440,530 B1 * | 10/2008 | Ballantyne | ................... | 375/358 |
| 7,546,494 B2 * | 6/2009 | Haas et al. | ................... | 714/700 |
| 2004/0076119 A1 * | 4/2004 | Aronson et al. | ............. | 370/249 |
| 2004/0264496 A1 * | 12/2004 | Shaffer et al. | ............... | 370/464 |
| 2005/0008041 A1 * | 1/2005 | Wu et al. | ..................... | 370/536 |
| 2005/0232308 A1 * | 10/2005 | Redfern | ....................... | 370/503 |

* cited by examiner

*Primary Examiner*—Chi H Pham
*Assistant Examiner*—Warner Wong
(74) *Attorney, Agent, or Firm*—Brosemer, Kolefas & Associates, LLC (57) ABSTRACT

Methods and apparatus for aligning the transmitters of two or more bidirectional ports of an integrated circuit (IC), particularly an application-specific IC (ASIC) or field-programmable gate array (FPGA). Misalignment of two or more transmitters is determined by the IC itself without the use of external test equipment. Receivers of the bidirectional ports whose transmitters are to be aligned are used by the IC to detect misalignment. Any misalignment of the receivers is also determined and either eliminated or taken into account when aligning the associated transmitters. Variants for ICs with and without internal loop-back capability and for ICs with and without differential outputs are described.

21 Claims, 5 Drawing Sheets

METHOD AND APPARATUS FOR TEMPORAL ALIGNMENT OF MULTIPLE PARALLEL DATA STREAMS

FIELD OF THE INVENTION

The present invention relates to the field of high-speed data communications, and in particular, to the processing of data in multiple parallel data streams.

BACKGROUND INFORMATION

Whenever multiple, parallel data streams clocked at a first lower rate are to be temporally multiplexed into one or more serial data streams of a higher rate, or whenever multiple data streams at some rate need to be available with a well-defined temporal phase relationship (e.g., before entering a digital-to-analog converter), it is important to temporally align the multiple, lower-rate, data streams. Often, the multiple data streams are generated inside an integrated circuit (IC), such as an application-specific integrated circuit (ASIC) or a field-programmable gate array (FPGA). The generation of the lower speed parallel data streams within an IC, i.e., in the IC "fabric" or "core," will typically be clocked in accordance with an internal clock of correspondingly lower frequency ($R_{IC}$). The multiple, lower speed parallel data streams are provided by the IC fabric to corresponding high-speed transmitters of the IC for high-speed ($R_{IO}$) serial output to external circuitry. While the transmitters of an IC are typically synchronized with each other on a time scale corresponding to $R_{IC}$, they are not necessarily synchronized with each other on the much finer time scale corresponding to $R_{IO}$.

The serialization carried out at each transmitter of the IC is typically at a substantially higher clock rate (e.g., $R_{IO}$=10 GHz) than is available in the IC core (e.g., $R_{IC}$=250 MHz). Each port will typically include circuitry to generate the higher rate clock based on the lower-rate core clock distributed to all ports by the core. As such, the different ports will have their own high speed clocks which will have the same frequency, but will not necessarily be in phase. In fact, the phase relationship among the various high speed clocks will generally be random and can change whenever the IC is powered up or re-programmed (in the case of an FPGA). This is due to the fact that the system and signal characteristics at the IC core clock frequency $R_{IC}$ are low-speed relative to $R_{IO}$; in particular, signal rise times, pulse shapes, and device switching thresholds are representative of signals at $R_{IC}$ rather than of signals at $R_{IO}$. As a result, using a low-speed, low-bandwidth clock signal, it is difficult to reliably synchronize multiple high-speed signals at $R_{IO}$.

Figure 1:
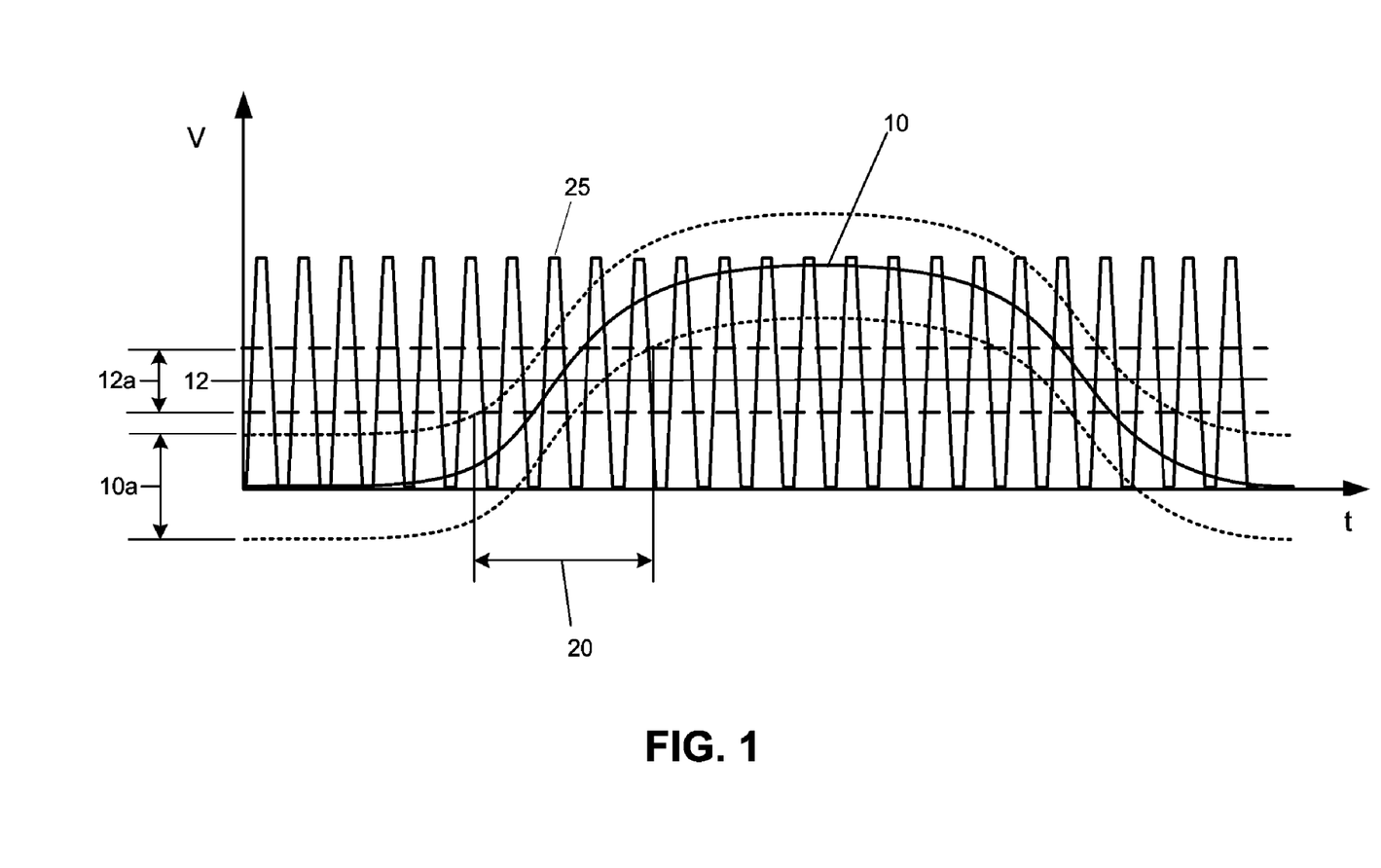
FIG. 1 illustrates the cause of synchronization uncertainty when generating high-speed signals from a low-speed signal.

FIG. 1 illustrates the nature of the problem described above. FIG. 1 shows a portion of a cycle of the low-rate internal IC clock signal 10 (at $R_{IC}$) with a region of uncertainty 10a within which the clock signal may fall. The synchronization of the high-rate $R_{IO}$ clock to the low-rate $R_{IC}$ clock will depend on the crossing of the low-rate clock through some threshold 12. The threshold 12 will also have a region of uncertainty 12a surrounding it. The overlap of the uncertainty regions 10a and 12a delimits a temporal range of uncertainty 20 over which the synchronization can occur. The range of uncertainty 20 may span several cycles of the high-speed IO clock signal (RIO), shown in FIG. 1 as signal 25, thus leading to misalignments of several bits.

As a result, data streams may be output by the IC with substantial temporal skew, or "inter-bit shift" amongst them. Instead of transitioning from one state to another synchronously, i.e., in "alignment," the data streams will typically transition at different times and are said to be "misaligned."

A solution to this alignment problem has been the use of parallel interface alignment protocols such as SFI-4 or SFI-5. This, however, requires that the device that receives the parallel data streams (e.g., a TDM multiplexer) is also equipped with such an interface, which may not always be the case in practice, and which may even be technically impossible.

SUMMARY OF THE INVENTION

In an exemplary embodiment, the present invention provides a scheme for the temporal alignment of multiple parallel data streams transmitted by different transmitters of a circuit, in particular an integrated circuit (IC) such as an ASIC or FPGA. The method can be automated and does not require external measurement and control devices. The alignment functionality or portions thereof can be implemented as part of the IC itself.

An exemplary method of aligning multiple transmitters of a circuit comprises the step of first aligning receivers that are associated with the transmitters. Once the receivers are aligned, data streams with the same test pattern are sent from the circuit core to the transmitters and looped-back via the respective receivers for reception by respective receive buffers. The contents of the receive buffers are compared to determine any misalignment between the transmitters. The amount of the misalignment is then used to pre-shift the transmitted data streams so as to offset the misalignment.

In a further exemplary embodiment, data stream alignment is carried out by first looping-back a test pattern via a first transmitter, to a receiver associated with a second transmitter, into a receive buffer coupled to the receiver. The same test pattern is then looped-back via the second transmitter and the receiver to the receive buffer. A comparison of the contents of the receive buffer after the second loop-back with the contents of the receive buffer after the first loop-back is used to determine the extent of the misalignment of the two transmitters, which can then be used to bring the two transmitters into alignment.

These and other features and aspects of the present invention are described more fully below.

DETAILED DESCRIPTION

An exemplary embodiment of a method in accordance with the present invention for temporally aligning the outputs of an integrated circuit will now be described with reference to FIGS. 2A and 2B, which show two transceiver ports 101 and 102 of an integrated circuit 100 during first and second portions of the method, respectively. Initially, only two ports A and B are shown for simplicity, with the alignment of more than two ports described further below.

As is common in ASIC and FPGA designs, each transceiver port 101 (102) has a pair of differential outputs, TXAn and TXAp (TXBn and TXBp) and a pair of differential inputs RXAn and RXAp (RXBn and RXBp). Each transceiver port 101 (102) may also have a loop-back capability whereby the state of its differential outputs TXAn and/or TXAp (TXBn and/or TXBp) can be looped-back via its inputs RXAn and/or RXAp (RXBn and/or RXBp) while any signals applied externally to the inputs may be ignored.

Figure 2A:
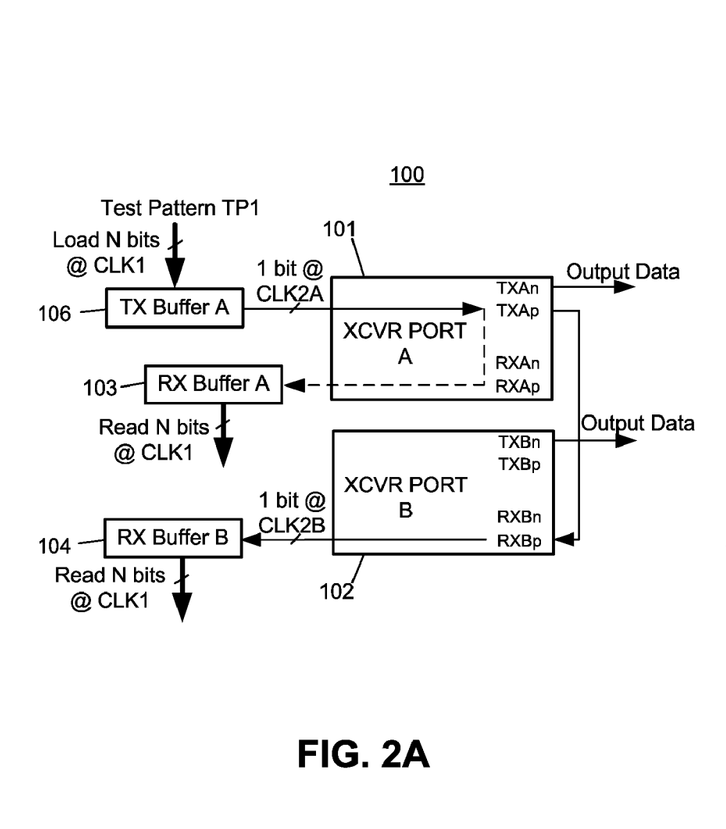
FIGS. 2A and 2B are schematic representations of a portion of an integrated circuit showing two transceiver ports during first and second portions, respectively, of an exemplary alignment method in accordance with the present invention.
Figure 2B:
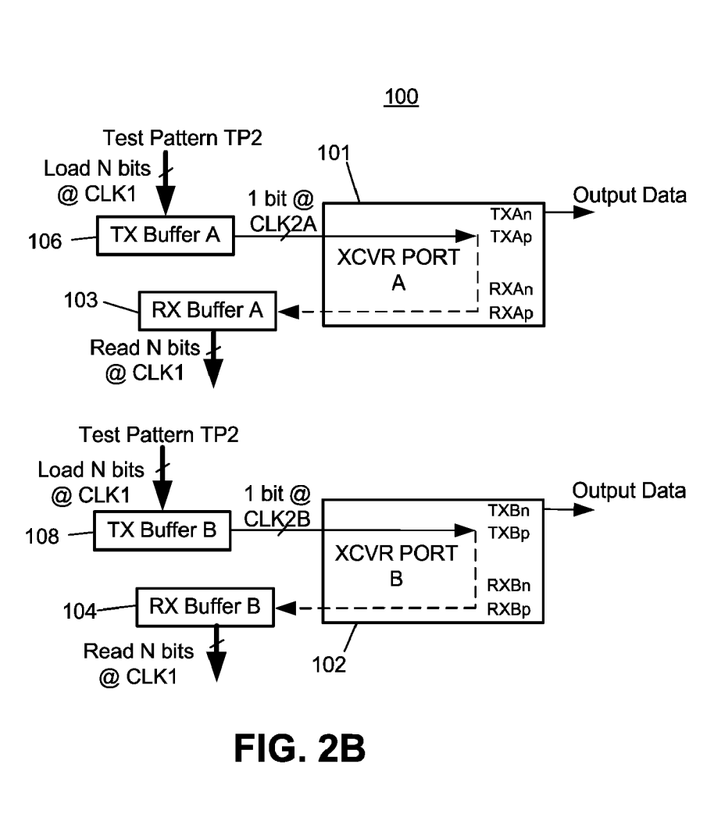

In the exemplary embodiment of FIGS. 2A and 2B, the inputs RXAp/n and RXBp/n of the ports 101 and 102, respectively, are coupled to receiver buffers 103 and 104, respectively. The receive buffers 103 and 104 are preferably of the same width (N bits). Each bidirectional port also has a transmit buffer (TX buffer A 106, TX Buffer B 108) associated with its transmitter. The transmit buffers 106 and 108 are also preferably of the same width (N bits).

In the configuration of FIG. 2A, a pre-defined test pattern TP1 is loaded in parallel from the fabric core of the IC 100 into the transmit buffer (TX Buffer A) 106 associated with the transceiver port A. Data is loaded into the TX Buffer A 106 in parallel at a first clock rate CLK1 (e.g., RIC=250 MHz) and serially read out of the TX Buffer A at a second, higher clock rate CLK2A that is N times faster than CLK1 (e.g., RIO=10 GHz, with N=40). CLK2A is generated in a conventional way from CLK1 (e.g., such as by frequency multiplication). The test pattern is preferably random and with the preferred pattern length depending on the overall amount of pattern shift uncertainty, i.e. the sum of all uncertainties to be handled in one step of the algorithm. In an exemplary embodiment, the test pattern is 2N bits long (e.g., 80 bits).

The test pattern TP1 is looped-back by the port A (i.e., TXAp/n→RXAp/n) to receive buffer A 103. The uninverted output of the port A, TXAp, is also coupled (internally or externally) to the uninverted input of the port B, RXBp, thereby causing the test pattern TP1 to be sent simultaneously to receive buffer B 104. The test pattern TP1 is shifted serially into receiver buffer B 104 in accordance with a clock CLK2B, which has the same frequency as CLK2A and is generated from CLK1 but which has an uncertain phase relationship with CLK1 and with CLK2A.

After the test pattern TP1 has been clocked out of the TX buffer A 106 and into the receive buffers 103 and 104, a determination of the misalignment of the receive paths of the ports A and B can be performed by comparing the contents of the RX buffers 103 and 104. Such a comparison can be carried out, for example, by an exclusive-OR (XOR) operation in which the corresponding bits of the RX buffers A and B (103 and 104) are XOR'ed together. If the comparison indicates that the contents of the RX buffers A and B are not the same (i.e., XOR=1), the contents of at least one of the buffers (e.g., RX buffer B) are bit-wise rotated and compared to the contents of the other buffer until equality is achieved (i.e., XOR=0). The number of bits by which the contents of the RX buffers were rotated relative to each other is thus indicative of the misalignment of the two receive paths. This number, which will be referred to as the receive path misalignment (RPM), is saved and is used whenever the buffers are re-filled and read again, to compensatingly rotate the contents of one or both of the receive buffers A and B relative to each other so as to bring the two receive paths into alignment.

In an alternative embodiment, if the first comparison of the RX buffers A and B indicates a misalignment (i.e., XOR=1), the RPM can be determined by turning off the loop-back within port A; (i) bit-wise rotating the test pattern TP1; (ii) loading the rotated test pattern into the TX buffer A 106; (iii) shifting the rotated test pattern out of TX buffer A 106; (iv) looping it back to the RX buffer B 104; (v) comparing the contents of the RX buffers A and B; and repeating the aforementioned steps i-v until the contents of RX buffer B match those of RX buffer A. The total amount by which the test pattern TP1 has been rotated until the match occurs is thus indicative of the RPM.

In yet a further exemplary embodiment, the comparison of the RX buffers A and B and the determination of the RPM can be carried out, for example, in software. In such an embodiment, the software can read the contents of the RX buffers A and B in search of the test pattern and determine the position of the test pattern in each buffer. The number of bits between the positions is thus indicative of the RPM.

Once the receive paths of the ports A and B have been aligned as described above, a second procedure, to be described now with reference to FIG. 2B, is carried out to align the transmit paths of the ports A and B. As shown by the dashed lines in FIG. 2B, a test pattern TP2 is loaded into TX buffer A 106 and into TX buffer B 108. The contents of TX buffer A are clocked out serially at CLK2A and looped-back to RX buffer A 103 and the contents of TX buffer B are clocked out serially at CLK2B and looped-back to RX buffer B 104. The steps of loading, clocking-out TX buffer A, and clocking-in RX buffer A, are preferably carried out simultaneously with the loading, clocking-out of TX buffer B, and clocking-in of RX buffer B, respectively, so as to save time, but is not a necessity. (Also, although not shown in FIG. 2B, the connection between TXAp and RXBp shown in FIG. 2A can be maintained during the second, transmit alignment procedure, since the receiver of port B, being in loop-back mode, would ignore the signal from port A anyway.)

Where the receive paths have already been aligned as described above in connection with FIG. 2A, the data streams received at the RX buffers A and B (103, 104) during the transmit alignment procedure contain information about any misalignment that may exist between the transmit paths, i.e., the transmit path misalignment (TPM). To determine whether a misalignment exists, the contents of the RX buffers A and B can be compared such as by XOR'ing their corresponding bits, with a XOR=1 indicating a misalignment. The TPM can be determined by iteratively rotating the data in one of the RX buffers A, B (e.g., one bit at a time) until the XOR combination between the two RX buffers A, B equals 0. The number of rotations required yields the misalignment between the transmitted data streams (i.e., the TPM). Once this misalignment has been determined, it can be used to pre-shift the user data before it is transmitted, thereby aligning the transmitted user data streams of the two transmitters to some desired bit shift.

In an alternative embodiment, if the first comparison of the RX buffers A and B indicates a misalignment (i.e., XOR=1), the TPM can be determined by (i) bit-wise rotating the test pattern TP2; (ii) loading the rotated test pattern TP2 into the TX buffer B 108; (iii) shifting the rotated test pattern out of TX buffer B; (iv) looping it back to the receive buffer B 104; (v) comparing the contents of RX buffer B to those of RX buffer A 103; and repeating the aforementioned steps i-v until the contents of the RX buffers A and B are the same. The total amount by which the test pattern TP2 has been rotated until the match occurs is thus indicative of the TPM.

In yet a further exemplary embodiment, the comparison of the RX buffers A and B and the determination of the TPM can be carried out, for example, in software. In such an embodiment, the software can read the contents of the RX buffers A and B in search of the test pattern TP2 and determine the position of the test pattern in each buffer. The number of bits between the positions is thus indicative of the TPM.

Where the receive path misalignment RPM has been determined and saved, as described above in connection with FIG. 2A, it is unnecessary to actually align the receive paths before performing the transmit path alignment described with respect to FIG. 2B. In this case, the contents of the RX buffers A and B after the procedure of FIG. 2B will reflect a combined receive and transmit path misalignment (i.e., RPM+TPM). Once this combined misalignment is determined (e.g., by the aforementioned iterative, XOR comparison of RX buffers), the TPM can be determined by subtracting the RPM from the combined misalignment. The TPM can then be used to pre-shift one or more of the bit streams of the ports A and B to cancel the TPM so that they will be transmitted in alignment.

As can be appreciated by one of ordinary skill in the art, portions of the above-described alignment procedures can be implemented in hardware (e.g., in the IC itself), in software, or a combination of both. For example, the comparison and bit-wise rotation of the contents of the RX buffers A and B can either be performed using logic on the IC or in a software routine that reads the RX buffers and processes their contents.

Figure 3:
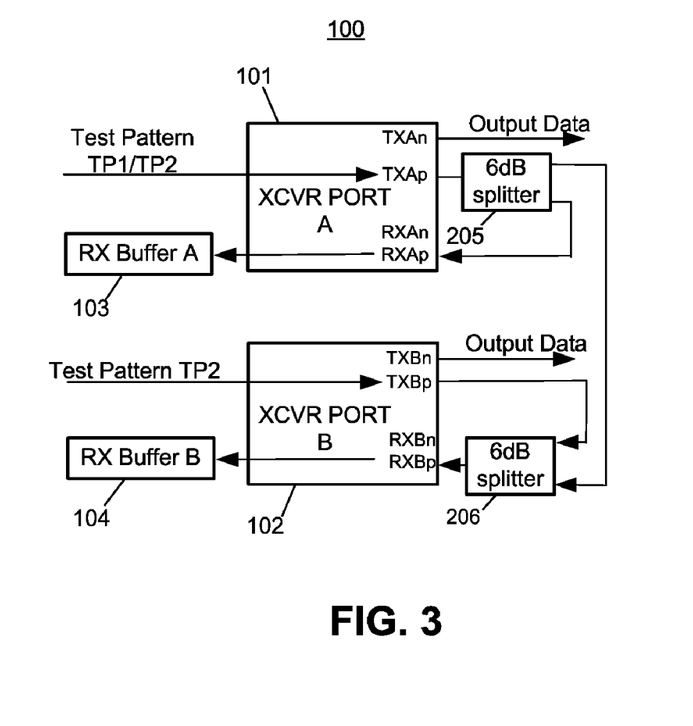
FIG. 3 is a schematic representation of a portion of an integrated circuit showing two transceiver ports during an exemplary alignment method in accordance with the present invention, wherein the transceiver ports lack loop-back capability.

As shown in FIGS. 2A and 2B, loop-back from the transmitter to the receiver of a transceiver port (101, 102) can be implemented internally to the IC. Where the IC lacks an internal loop-back capability, however, loop-back can be implemented external to the IC, as illustrated in FIG. 3. In the embodiment shown, a splitter 205 is used to couple TXAp to RXAp and to RXBp, allowing implementation of the receive path alignment procedure described above with reference to FIG. 2A. A further splitter 206 is used to couple TXBp and TXAp to RXBp, thereby allowing implementation of the transmit path alignment procedure described above with reference to FIG. 2B. Note, however, that because the transceiver ports A and B lack the internal loop-back capability, their respective receivers are not capable of ignoring signals applied to them externally. As such, when carrying out the transmit path alignment procedure, test pattern TP2 is loaded into TX buffer A 106, clocked-out of TX buffer A, and looped-back and clocked-in to RX buffer A while port B remains inactive. Once this has been completed, test pattern TP2 is then loaded into TX buffer B 108, clocked-out of TX buffer B, and looped-back and clocked-in to RX buffer B while port A remains inactive (i.e., the contents of RX buffer A reflect the prior loop-back of test pattern TP2 into RX buffer A). The contents of RX buffers A and B can then be compared, as described above, to determine the transmit path misalignment.

Figure 4:
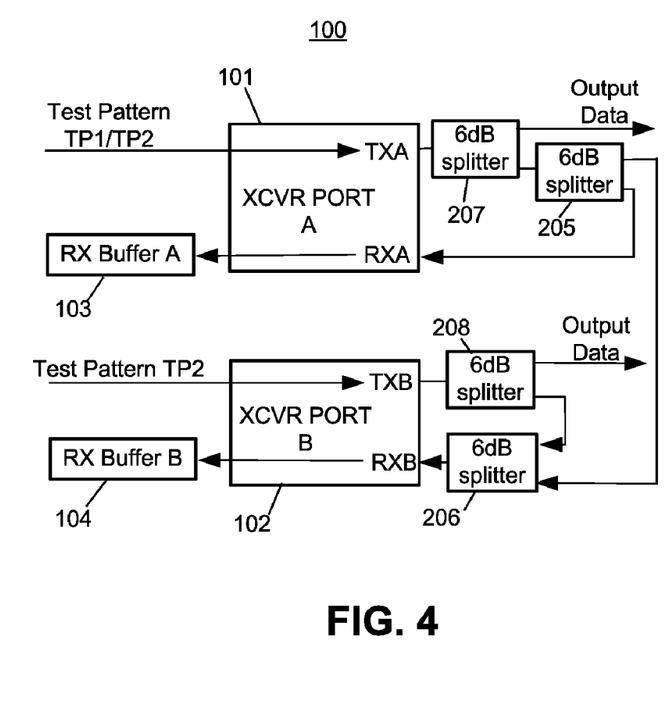
FIG. 4 is a schematic representation of a portion of an integrated circuit showing two transceiver ports during an exemplary alignment method in accordance with the present invention, wherein the transceiver ports lack differential outputs.

The above embodiments assume the use of transceiver ports 101, 102 with differential outputs (e.g., TXAp, TXAn). For those cases in which the transceivers lack the internal loop-back capability and do not have differential outputs, an alternative arrangement, such as that illustrated in FIG. 4, can be used. In the exemplary arrangement of FIG. 4, a splitter 207 is inserted between the transceiver 101 output TXA and the splitter 205, with one output of the splitter 207 providing the output data and the other output of the splitter being coupled to the input of the splitter 205 for the loop-back to receiver inputs RXA and RXB. An additional splitter 208 is provided at the transceiver 102 output TXB, with one output of the splitter 208 providing the output data and the other output of the splitter being coupled to the input of the splitter 206 for the loop-back to input RXB.

The various splitters 205-208 mentioned above can be implemented in a known way, such as with standard, "6 dB" or "50:50" power splitters, for example, as long as the inputs coupled to the splitter outputs receive a signal larger than the required minimum input level.

Figure 5:
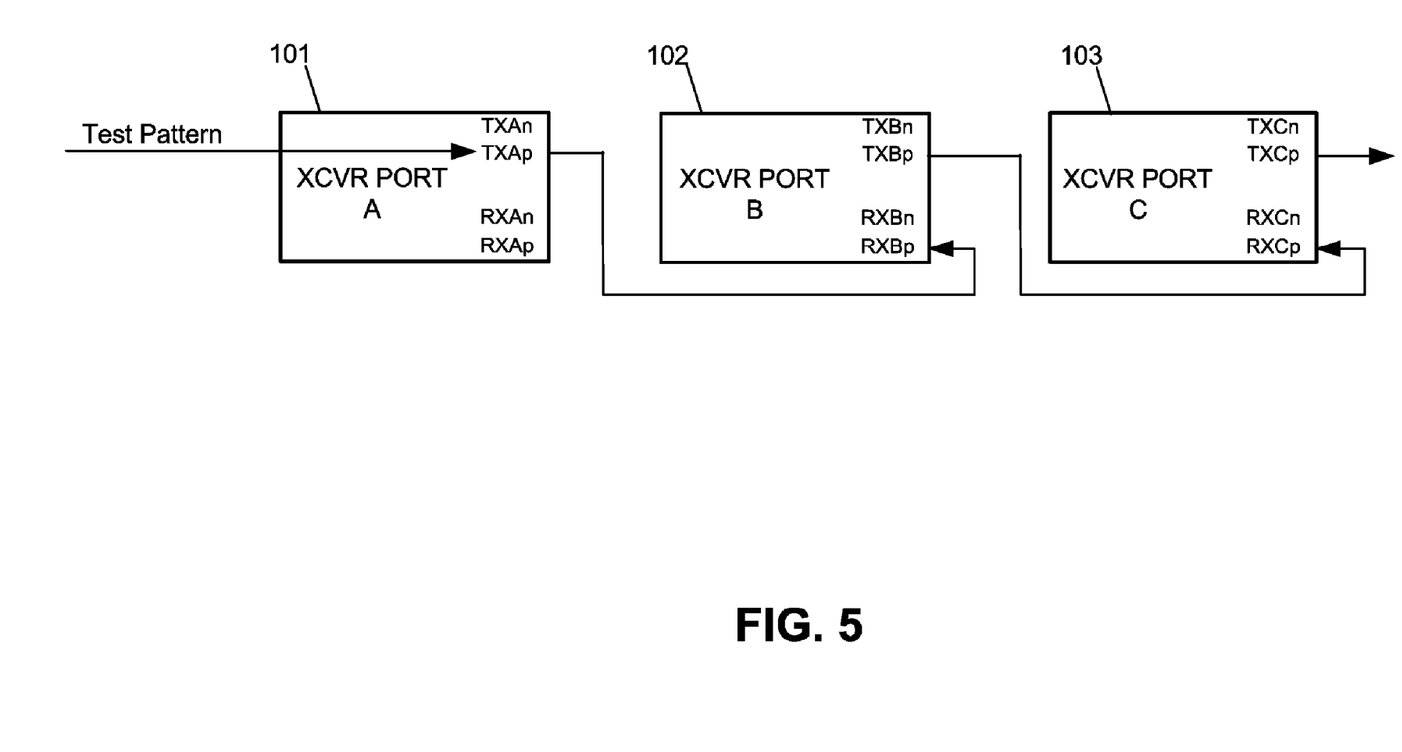
FIG. 5 shows an exemplary embodiment of an arrangement for the alignment of more than two ports in accordance with the present invention.

FIG. 5 shows an exemplary embodiment of an arrangement for the alignment of more than two ports. In the arrangement of FIG. 5, ports are aligned pair-wise; i.e., ports A and B are aligned first, then ports B and C, and so on. For ports lacking internal loop-back and/or differential outputs, the configurations described above with reference to FIGS. 3 and 4 can be readily applied to the arrangement of FIG. 5, as can be appreciated by one of ordinary skill in the art.

Figure 6A:
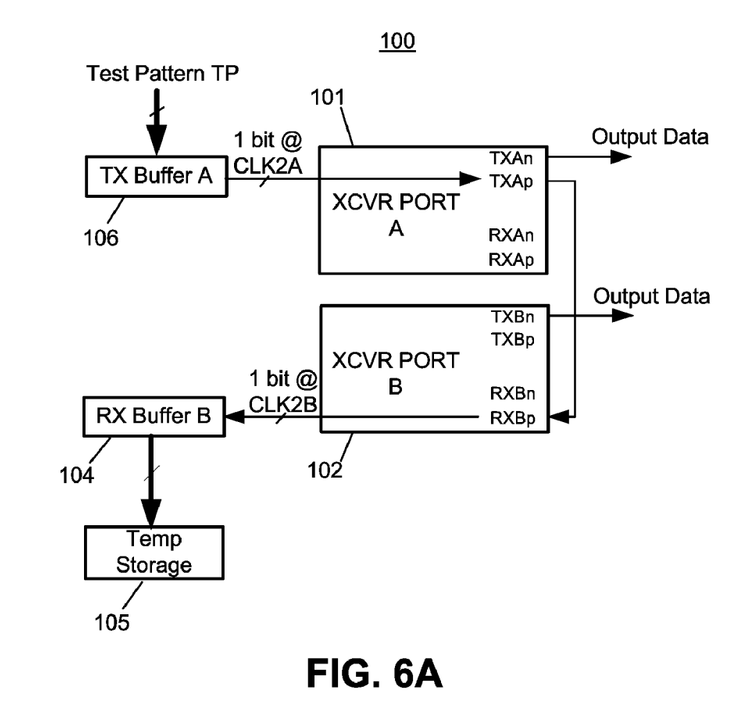
FIGS. 6A and 6B are schematic representations of a portion of an integrated circuit showing two transceiver ports during a further exemplary alignment method in accordance with the present invention.
Figure 6B:
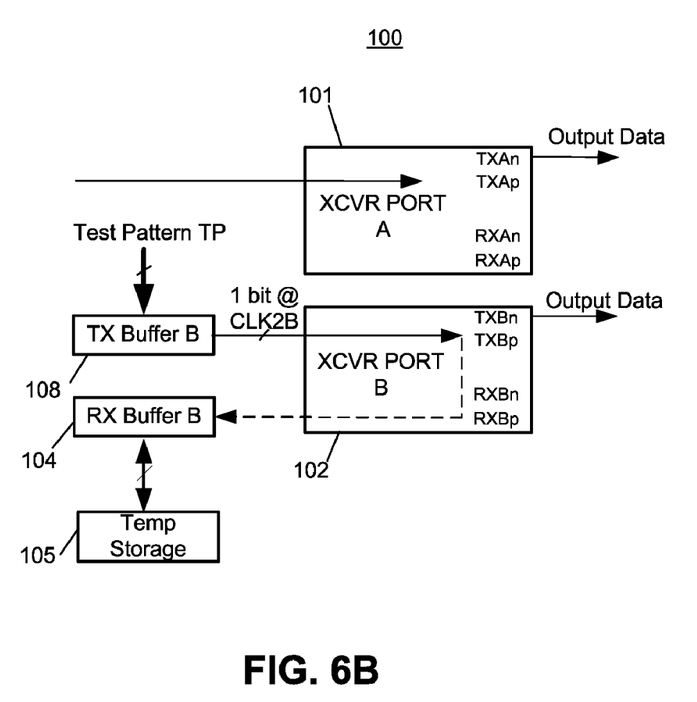

FIGS. 6A and 6B show an arrangement for aligning two ports A and B without first aligning their receive paths. In a further exemplary embodiment of a method of the present invention, a test pattern is first loaded into the TX buffer A 106 from the IC fabric and serially shifted to the output TXAp of port 101 in accordance with the clock CLK2A. The test pattern is looped-back to input RXBp and serially shifted into RX buffer B 104 in accordance with clock CLK2B. After the test pattern has been shifted out of the TX buffer A 106, the contents of the RX buffer B are placed in temporary storage 105. The IC fabric then loads the same test pattern to the TX buffer B 108 which is then serially shifted to the output TXBp of port 102 in accordance with the clock CLK2B. The port 102 is configured to loop-back the test pattern to the RX buffer B 104.

After the test pattern has shifted out of the TX buffer B 108, the contents of the RX buffer B are compared to the contents of the temporary storage 105. If the contents of the RX buffer B are the same as that of the temporary storage 105, a determination is made that the transmitters of ports A and B are in alignment. If the contents are not the same, the test pattern is shifted by one bit, reloaded into the TX buffer B 108 and shifted out of TX buffer B and into RX buffer B 104 via the internal loop-back. The contents of the RX buffer 104 are then compared again to the temporary storage 105 and the above process is repeated until a match is attained. For a test pattern that is 2N bits long, up to 2N different versions of the test pattern (each version shifted by one bit relative to the previous version) can be looped-back until a match is found. Once there is a match, a determination can be made of the extent of the misalignment (i.e., the TPM) between the transmit paths of ports A and B, the TPM being equivalent to the amount by which the test pattern was shifted to attain the aforementioned match. The TPM can then be used to compensatingly pre-shift the contents of at least one of the TX buffers A and B to bring the ports into alignment.

Note that in the embodiment of FIGS. 6A and 6B, port A need not be bidirectional since there is no need for the port A to have a receiver in order to carry out the alignment method.

In an alternative embodiment, the extent of the misalignment (i.e., the TPM) between the transmit paths of ports A and B can be determined by iteratively rotating the contents of at least one of the RX buffer B 104 and the temporary storage 105 and comparing the two until a match is attained. The number of bits by which the contents of the RX buffer B 104 were rotated relative to each other until the match is achieved is thus indicative of the misalignment of the two transmit paths.

In yet a further exemplary embodiment, the comparison of the temporary storage and the RX buffer B and the determination of the TPM can be carried out, for example, in software. In such an embodiment, the software can read the contents of the temporary storage and the RX buffer B in search of the test pattern and determine the position of the test pattern in each. The number of bits between the positions is thus indicative of the TPM.

For ports lacking a loop-back capability and/or differential outputs, the configurations described above with reference to FIGS. 3 and 4 can be readily applied to the arrangements of FIGS. 6A and 6B, as can be appreciated by one of ordinary skill in the art.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of aligning data streams output by two or more bidirectional ports of a circuit, comprising:
   determining a receive path misalignment between a first receiver associated with a first transmitter and a second receiver associated with a second transmitter;
   aligning the first and second receivers by shifting at least one of the first and second receivers in accordance with the receive path misalignment so as to offset the receive path misalignment;
   determining a transmit path misalignment between the first transmitter and the second transmitter by:
      looping-back a test pattern via the first transmitter and the first receiver to a first receive buffer,
      looping-back the test pattern via the second transmitter and the second receiver to a second receive buffer, and
      comparing the contents of the first and second receive buffers; and
   shifting a data stream output by at least one of the first and second transmitters in accordance with the transmit path misalignment so as to offset the transmit path misalignment.

2. The method of claim 1, wherein the step of determining the receive path misalignment includes:
   looping-back a test pattern via the first transmitter and the first receiver to a first receive buffer,
   looping-back the test pattern via the first transmitter and the second receiver to a second receive buffer, and
   comparing the contents of the first and second receive buffers so that if the contents are the same, a determination is made that the first and second receivers are in alignment, and if the contents are not the same, determining the receive path misalignment.

3. The method of claim 2, wherein determining the receive path misalignment includes:
   rotating at least one of the contents of the first and second receive buffers,
   comparing the contents of the first and second receive buffers,
   repeating the rotating and comparing steps until the contents of the first and second receive buffers are the same, and
   determining the receive path misalignment based on the amount that the contents of the first and second receive buffers have been rotated relative to each other.

4. The method of claim 2, wherein determining the receive path misalignment includes:
   rotating the test pattern,
   looping-back the rotated test pattern via the first transmitter and the second receiver to the second receive buffer,
   comparing the contents of the first and second receive buffers,
   repeating the rotating, looping-back and comparing steps until the contents of the first and second receive buffers are the same, and
   determining the receive path misalignment based on the amount that the test pattern has been rotated.

5. The method of claim 1, wherein at least one of looping-back a test pattern via the first transmitter and the first receiver to a first receive buffer, and looping-back the test pattern via the second transmitter and the second receiver to a second receive buffer, is performed external to the circuit.

6. The method of claim 1, wherein the first transmitter and the first receiver are each part of a first bidirectional port of the circuit and wherein the second transmitter and the second receiver are each part of a second bidirectional port of the circuit.

7. The method of claim 2, wherein determining the transmit path misalignment includes:
   rotating at least one of the contents of the first and second receive buffers,
   comparing the contents of the first and second receive buffers,
   repeating the rotating and comparing steps until the contents of the first and second receive buffers are the same, and
   determining the transmit path misalignment based on the amount that the contents of the first and second receive buffers have been rotated relative to each other.

8. The method of claim 2, wherein determining the transmit path misalignment includes:
   rotating the test pattern,
   looping-back the rotated test pattern via the second transmitter and the second receiver to the second receive buffer,
   comparing the contents of the first and second receive buffers,
   repeating the rotating, looping-back and comparing steps until the contents of the first and second receive buffers are the same, and
   determining the transmit path misalignment based on the amount that the test pattern has been rotated.

9. A method of aligning data streams output by two or more bidirectional ports of a circuit, comprising:
   looping-back a test pattern via a first transmitter and a receiver associated with a second transmitter to a receive buffer;
   storing the contents of the receive buffer;
   looping-back the test pattern via the second transmitter and the receiver to the receive buffer;
   comparing the contents of the receive buffer with the stored previous contents of the receive buffer so that if the contents are the same, a determination is made that the first and second transmitters are in alignment, and if the contents are not the same, determining a misalignment between the first and second transmitters and shifting a data stream output by at least one of the first and second transmitters in accordance with the misalignment so as to offset the misalignment.

10. The method of claim 9, wherein determining the misalignment between the first and second transmitters includes:
   rotating the test pattern, looping-back the rotated test pattern via the second transmitter and the receiver, comparing the contents of the receive buffer with the stored previous contents of the receive buffer, repeating the rotating, looping-back and comparing steps until the contents of the receive buffer are the same as the stored previous contents of the receive buffer, and determining the misalignment between the first and second transmitters based on the amount that the test pattern has been rotated.

11. The method of claim 9, wherein determining the misalignment between the first and second transmitters includes:

rotating at least one of the contents of the receive buffer and the stored previous contents of the receive buffer, comparing the contents of the receive buffer with the stored previous contents of the receive buffer, repeating the rotating and comparing steps until the contents of the receive buffer are the same as the stored previous contents of the receive buffer, and determining the misalignment between the first and second transmitters based on the amount that the contents of the receive buffer and the stored previous contents of the receive buffer have been rotated relative to each other.

12. The method of claim 9, wherein looping-back the test pattern via the second transmitter and the receiver to the receive buffer is performed external to the circuit.

13. The method of claim 9, wherein the second transmitter and the receiver are each part of a bidirectional port of the circuit.

14. A method of aligning data streams output by two or more bidirectional ports of a circuit, comprising:

determining a receive path misalignment between a first receiver associated with a first transmitter of a first port and a second receiver associated with a second transmitter of a second port;

determining a combined path misalignment between the first port and the second port by:

looping-back a test pattern via the first transmitter and the first receiver to a first receive buffer, looping-back the test pattern via the second transmitter and the second receiver to a second receive buffer, and comparing the contents of the first and second receive buffers;

determining a transmit path misalignment between the first transmitter and the second transmitter as a function of the combined path misalignment and the receive path misalignment; and shifting a data stream output by at least one of the first and second transmitters in accordance with the transmit path misalignment so as to offset the transmit path misalignment.

15. The method of claim 14, wherein the step of determining the receive path misalignment includes:

looping-back a test pattern via the first transmitter and the first receiver to a first receive buffer, looping-back the test pattern via the first transmitter and the second receiver to a second receive buffer, and comparing the contents of the first and second receive buffers so that if the contents are the same, a determination is made that the first and second receivers are in alignment, and if the contents are not the same, determining the receive path misalignment.

16. The method of claim 14, wherein determining the receive path misalignment includes:

rotating at least one of the contents of the first and second receive buffers, comparing the contents of the first and second receive buffers, repeating the rotating and comparing steps until the contents of the first and second receive buffers are the same, and determining the receive path misalignment based on the amount that the contents of the first and second receive buffers have been rotated relative to each other.

17. The method of claim 15, wherein determining the receive path misalignment includes:

rotating the test pattern, looping-back the rotated test pattern via the first transmitter and the second receiver to the second receive buffer, comparing the contents of the first and second receive buffers, repeating the rotating, looping-back and comparing steps until the contents of the first and second receive buffers are the same, and determining the receive path misalignment based on the amount that the test pattern has been rotated.

18. The method of claim 14, wherein at least one of looping-back a test pattern via the first transmitter and the first receiver to a first receive buffer, and looping-back the test pattern via the second transmitter and the second receiver to a second receive buffer, is performed external to the circuit.

19. The method of claim 14, wherein the first transmitter and the first receiver are each part of a first bidirectional port of the circuit and wherein the second transmitter and the second receiver are each part of a second bidirectional port of the circuit.

20. The method of claim 15, wherein determining the combined path misalignment includes:

rotating at least one of the contents of the first and second receive buffers, comparing the contents of the first and second receive buffers, repeating the rotating and comparing steps until the contents of the first and second receive buffers are the same, and determining the combined path misalignment based on the amount that the contents of the first and second receive buffers have been rotated relative to each other.

21. The method of claim 15, wherein determining the combined path misalignment includes:

rotating the test pattern, looping-back the rotated test pattern via the second transmitter and the second receiver to the second receive buffer, comparing the contents of the first and second receive buffers, repeating the rotating, looping-back and comparing steps until the contents of the first and second receive buffers are the same, and determining the combined path misalignment based on the amount that the test pattern has been rotated.

* * * * *

UNITED STATES PATENT AND TRADEMARK OFFICE
CERTIFICATE OF CORRECTION

PATENT NO.      : 7,613,125 B2                                              Page 1 of 1
APPLICATION NO. : 11/306425
DATED           : November 3, 2009
INVENTOR(S)     : Fidler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Nineteenth Day of October, 2010

David J. Kappos
*Director of the United States Patent and Trademark Office*